US011673769B2

(12) United States Patent
Sudi et al.

(10) Patent No.: US 11,673,769 B2
(45) Date of Patent: Jun. 13, 2023

(54) ELEVATOR MONITORING USING VIBRATION SENSORS NEAR THE ELEVATOR MACHINE

(71) Applicant: OTIS ELEVATOR COMPANY, Farmington, CT (US)

(72) Inventors: Sandeep Sudi, Farmington, CT (US); Michael C. Lang, Southbury, CT (US); Martin J. Hardesty, West Hartford, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 1029 days.

(21) Appl. No.: 16/106,442

(22) Filed: Aug. 21, 2018

(65) Prior Publication Data

US 2020/0062544 A1 Feb. 27, 2020

(51) Int. Cl.
*B66B 5/00* (2006.01)
*G01H 11/06* (2006.01)
*G01P 15/18* (2013.01)
*B66B 1/34* (2006.01)
*B66B 5/06* (2006.01)

(52) U.S. Cl.
CPC .......... *B66B 5/0025* (2013.01); *B66B 1/3492* (2013.01); *B66B 5/0037* (2013.01); *B66B 5/06* (2013.01); *G01H 11/06* (2013.01); *G01P 15/18* (2013.01)

(58) Field of Classification Search
CPC ... B66B 5/0025; B66B 5/0037; B66B 5/0018; B66B 5/087; B66B 1/3492; B66B 5/06; G01H 11/06; G01P 15/18
See application file for complete search history.

(56) References Cited

U.S. PATENT DOCUMENTS

| 6,050,368 A | * | 4/2000 | Pakarinen ................. B66B 1/30 187/293 |
|---|---|---|---|
| 7,004,289 B2 | | 2/2006 | Shrum, III et al. |
| 7,073,633 B2 | | 7/2006 | Weinberger et al. |
| 7,181,370 B2 | | 2/2007 | Furem et al. |
| 7,689,394 B2 | | 3/2010 | Furem et al. |
| 7,703,579 B2 | | 4/2010 | Tyni et al. |
| 8,988,237 B2 | | 3/2015 | Liu et al. |
| 9,309,089 B2 | | 4/2016 | Annen et al. |

(Continued)

FOREIGN PATENT DOCUMENTS

| CN | 105293238 A | 2/2016 |
| JP | 2008150186 | 7/2008 |

OTHER PUBLICATIONS

The Extended European Search Report for EP Application No. 19192832.4, dated Feb. 24, 2020.

(Continued)

*Primary Examiner* — Helen C Kwok
(74) *Attorney, Agent, or Firm* — Carlson, Gaskey & Olds, P.C.

(57) ABSTRACT

An illustrative example embodiment of an elevator system includes a machine including a motor and a brake. The machine is configured to selectively cause movement of an elevator car. At least one vibration sensor situated near the machine provides an indication of operation of the machine to indicate at least stops and starts of the machine associated with stopping and starting movement of the elevator car.

13 Claims, 2 Drawing Sheets

(56) References Cited

U.S. PATENT DOCUMENTS

| | | |
|---|---|---|
| 9,565,275 B2 | 2/2017 | Lawson et al. |
| 9,578,398 B2 | 2/2017 | Svoen et al. |
| 9,580,276 B2 | 2/2017 | Toutaoui |
| 9,729,639 B2 | 8/2017 | Sustaeta et al. |
| 9,977,422 B2 | 5/2018 | Steele et al. |
| 2004/0094366 A1* | 5/2004 | Weinberger ............ B66B 5/0025 187/247 |
| 2006/0289241 A1* | 12/2006 | Okamoto ................. B66B 5/04 187/292 |
| 2011/0147135 A1* | 6/2011 | Birrer ....................... B66B 5/06 187/393 |
| 2011/0202312 A1* | 8/2011 | Sumi ..................... B66B 25/006 702/182 |
| 2011/0240414 A1* | 10/2011 | Carreno ................ B66B 5/0025 187/390 |
| 2013/0283907 A1* | 10/2013 | Kang ..................... G01C 19/00 73/504.02 |
| 2016/0023864 A1* | 1/2016 | Roberts ..................... B66B 1/44 187/254 |
| 2016/0130114 A1* | 5/2016 | Wilke ................... B66B 5/0025 187/393 |
| 2017/0029244 A1 | 2/2017 | Madarasz et al. |
| 2017/0233219 A1* | 8/2017 | Studer .................... B66B 1/365 187/247 |
| 2018/0086597 A1 | 3/2018 | Song et al. |
| 2018/0148298 A1 | 5/2018 | De Angelis |
| 2018/0162686 A1 | 6/2018 | Wang et al. |
| 2020/0002127 A1* | 1/2020 | Kusserow ............. B66B 5/0031 |
| 2020/0002134 A1* | 1/2020 | Kondo ................. B66B 1/3476 |
| 2020/0283259 A1* | 9/2020 | Viita-aho .................. B66B 9/00 |
| 2020/0339384 A1* | 10/2020 | Sonnenmoser ........... G01J 5/00 |
| 2021/0139274 A1* | 5/2021 | Tschuppert ............. B66B 27/00 |

OTHER PUBLICATIONS

EPO Communication pursuant to Article 94(3) EPC, EP Application No. 19192832.4 dated Apr. 8, 2022.

\* cited by examiner

ELEVATOR MONITORING USING VIBRATION SENSORS NEAR THE ELEVATOR MACHINE

BACKGROUND

Elevator systems are useful for carrying passengers and items between different levels in a building. While elevator systems are reliable, they are prone to require maintenance or repair as system components age or become damaged. Various approaches at addressing such issues have been developed over time. While there is a desire to obtain better performance data for monitoring elevator systems, there currently is no solution for providing such data at a reasonable cost.

SUMMARY

An illustrative example embodiment of an elevator system includes a machine including a motor and a brake. The machine is configured to selectively cause movement of an elevator car. At least one vibration sensor situated near the machine provides an indication of operation of the machine to indicate at least stops and starts of the machine associated with stopping and starting movement of the elevator car.

An example embodiment that includes one or more features of the elevator system of the previous paragraph includes a communication interface configured to communicate information corresponding to the indication of operation of the machine to a device remote from the elevator system. The at least one vibration sensor provides a real time indication of operation of the machine and the communication interface communicates the information in real time.

In an example embodiment that includes one or more features of the elevator system of any of the previous paragraphs, the at least one vibration sensor provides an indication of operation of the brake of the machine including timing information.

In an example embodiment that includes one or more features of the elevator system of any of the previous paragraphs, the timing information corresponds to timing of at least one of a brake release, a brake pick, and brake squeal.

In an example embodiment that includes one or more features of the elevator system of any of the previous paragraphs, the at least one vibration sensor provides an indication of any emergency stops of the elevator car implemented through the machine.

In an example embodiment that includes one or more features of the elevator system of any of the previous paragraphs, the machine includes a plurality of bearings and the at least one vibration sensor provides an indication of a condition of at least one of the bearings.

In an example embodiment that includes one or more features of the elevator system of any of the previous paragraphs, the stopping and starting movement of the elevator car occurs for each of a plurality of runs of the elevator car and the processor provides information regarding trends of the plurality of runs.

An example embodiment that includes one or more features of the elevator system of any of the previous paragraphs includes a processor that process the indication of operation of the machine. The processor determines a condition of at least a portion of the machine based on the indication of operation of the machine and the processor provides an output corresponding to the determined condition.

An example embodiment that includes one or more features of the elevator system of any of the previous paragraphs includes a communication interface configured to communicate information corresponding to the indication of operation of the machine to a device remote from the elevator system. The information communicated by the communication interface provides an indication of the determined condition of at least the portion of the machine and the information communicated by the communication interface describes the condition as at least one of acceptable, working but maintenance is needed soon, and needs immediate repair.

In an example embodiment that includes one or more features of the elevator system of any of the previous paragraphs, a plurality of predetermined vibration thresholds indicate a respective plurality of conditions of the machine, the processor determines a relationship between the indication of operation of the machine and at least one of the thresholds, and the processor determines the condition of at least the portion of the machine based on the determined relationship.

An example embodiment that includes one or more features of the elevator system of any of the previous paragraphs includes a machine frame that supports the machine in a selected position and wherein the at least one vibration sensor is supported on at least one of the machine and the machine frame.

In an example embodiment that includes one or more features of the elevator system of any of the previous paragraphs, the brake is situated near one end of the machine frame and the at least one vibration sensor is supported on the machine frame closer to the one end than an opposite end of the machine frame.

In an example embodiment that includes one or more features of the elevator system of any of the previous paragraphs, the at least one sensor comprises a tri-axial microelectromechanical (MEMS) vibration sensor.

An illustrative example method of monitoring an elevator system with a machine configured to selectively cause movement of an elevator car includes using at least one vibration sensor situated near the machine to obtain an indication of operation of the machine to indicate at least stops and starts of the machine associated with stopping and starting movement of the elevator car.

An example embodiment that includes one or more features of the method of the previous paragraph includes obtaining the indication in real time and communicating the information in real time to a device remote from the elevator system.

In an example embodiment that includes one or more features of the method of any of the previous paragraphs, obtaining the indication of operation of the machine comprises obtaining an indication of operation of a brake of the machine including timing information corresponding to timing of at least one of a brake release, a brake pick, and brake squeal.

An example embodiment that includes one or more features of the method of any of the previous paragraphs includes using a processor to process the indication of operation of the machine, and the processor provides information regarding trends of a plurality of runs of the elevator car, wherein the stopping and starting movement of the elevator car occurs for each of the plurality of runs of the elevator car.

An example embodiment that includes one or more features of the method of any of the previous paragraphs includes determining a condition of at least a portion of the machine based on the indication of operation of the machine and the condition is as at least one of acceptable, working but maintenance is needed soon, and needs immediate repair.

In an example embodiment that includes one or more features of the method of any of the previous paragraphs, a plurality of predetermined vibration thresholds indicate a respective plurality of conditions of the machine and the method comprises determining a relationship between the indication of operation of the machine and at least one of the thresholds, and determining the condition of at least the portion of the machine based on the determined relationship.

In an example embodiment that includes one or more features of the method of any of the previous paragraphs, the machine includes a plurality of bearings and the method comprises providing an indication of a condition of at least one of the bearings.

The various features and advantages of at least one disclosed example embodiment will become apparent to those skilled in the art from the following detailed description. The drawings that accompany the detailed description can be briefly described as follows.

DETAILED DESCRIPTION

Embodiments of this invention provide an ability to obtain information regarding performance or a condition of a portion of an elevator system based on vibration indications corresponding to operation of an elevator machine.

Figure 1:
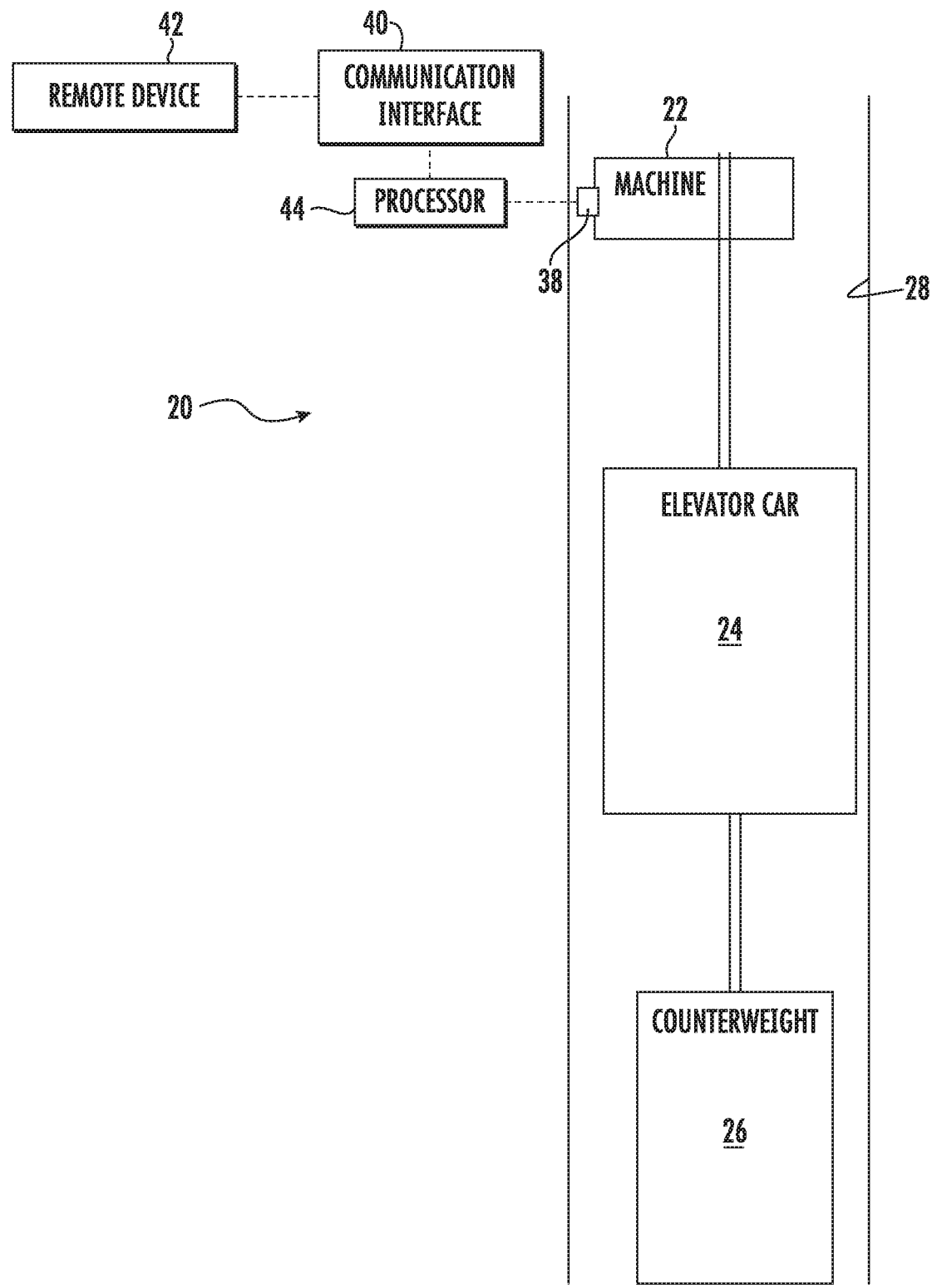
FIG. 1 schematically illustrates selected portions of an elevator system designed according to an embodiment of this invention FIG. 2 schematically illustrates vibration sensors situated near an elevator machine according to an embodiment of this invention.
Figure 2:
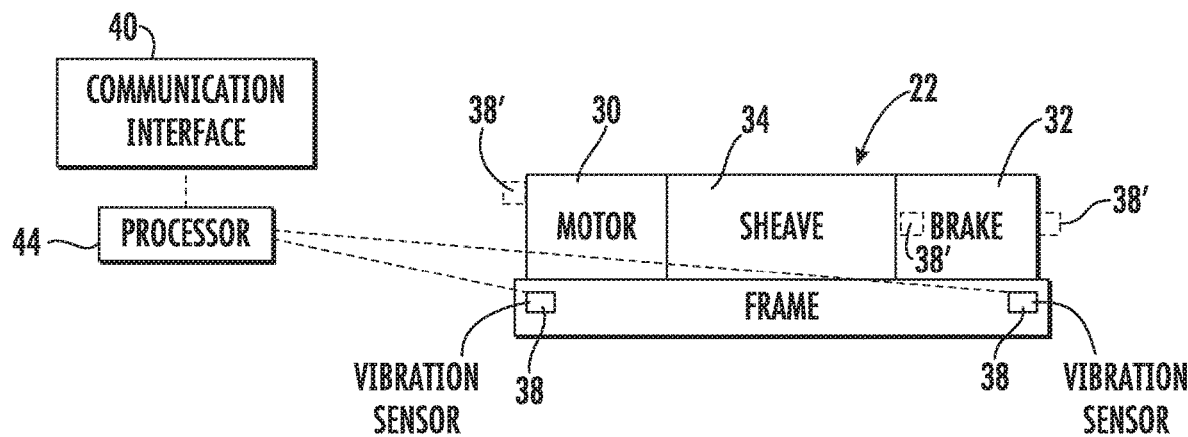

FIG. 1 schematically illustrates selected portions of an example elevator system 20. An elevator machine 22 is configured to selectively control movement of an elevator car 24 and counterweight 26 in a generally known manner. As shown in FIG. 2, the elevator machine 22 includes a motor 30, a brake 32 and a traction sheave 34. The machine also includes bearings, which are not visible in the illustration. The machine 22 is mounted within the elevator system 20 using a support frame 36.

At least one vibration sensor 38 is situated near the machine 22 for detecting vibrations associated with operation of the machine 22. For illustration purposes, two vibration sensors 38 are shown in FIG. 2. Other vibration sensor locations are shown in phantom at 38' in FIG. 2. The vibration sensors 38 may be situated on any portion of the machine 22, the frame 36 or a nearby structure where vibrations associated with operation fo the machine 22 are detectable. The vibration sensors 38 provide an indication of operation of the machine that indicates at least stops and starts of the machine associated with stopping and starting movement of the elevator car 24. The vibration sensors 38 situated near the machine 22 provide an economical source of elevator system performance information. The performance data of the elevator system 20 has a close relationship to machine operation including the starting and stopping of the machine 22 during each run of the elevator car 24.

For purposes of monitoring operation of the brake 32, at least one of the vibration sensors 38 is situated on the support frame 36 close to the brake 32. In the illustrated example embodiment of FIG. 2, the brake 32 is situated near one end of the frame 36. At least one of the vibration sensors 38 is situated closer to that end of the frame 36 than an opposite end.

The vibration sensors 38 capture a frequency associated with operation of the machine 22. Each component of the machine 22 has a unique frequency signature that is useful for providing an indication of a status or operation of the corresponding component and the machine 22. A variety of known vibration sensors may be included in different embodiments. In some embodiments, the vibration sensors 38 comprise wireless vibration sensors. Other embodiments include tri-axial microelectromechanical (MEMS) vibration sensors.

The indication of the operation of the machine 22 is useful for ongoing monitoring or analysis of the elevator system 20. For example, a real time output or communication of the indication allows a technician or mechanic to monitor a "heartbeat" of the elevator system 20 in real time. In some embodiments such information is available to an individual present at the location of the elevator system. In some embodiments the indication of machine operation is provided to a remotely located mechanic or technician through a communication interface 40 that is configured to communicate information corresponding to the indication of operation of the machine 22 to a remote device 42 that is separate from the elevator system 20. In some example embodiments, the remote device 42 comprises a communication tool used by an elevator mechanic or technician. Some such remote devices 42 comprise a hand-held device, such as a smartphone or a dedicated elevator monitoring and servicing device. Some embodiments include communications from the communication interface 40 to a remote device 42 that comprises a monitoring device accessible by a remote elevator expert.

As shown in FIG. 2, the illustrated example embodiment includes a processor 44 that comprises a computing device programmed or configured to receive the vibration indications from the vibration sensors 38 and process them to determine a condition of one or more of the components of the elevator machine 22. While the processor 44 is schematically illustrated as a separate component from the communication interface 40, it is possible for the two schematically shown features to be incorporated into a single device. In this embodiment, the processor 44 has access to predetermined thresholds (e.g., stored in memory) corresponding to different operating conditions of the elevator system 20. When the output from the vibration sensors 38 exceeds one of those thresholds, the processor 44 determines that a particular corresponding condition or operation of the machine 22 has occurred or exists. The processor 44 determines a relationship between the output of at least one of the vibration sensors 38 and at least one of the predetermined thresholds for determining the condition or status of the machine 22.

Figure 3:
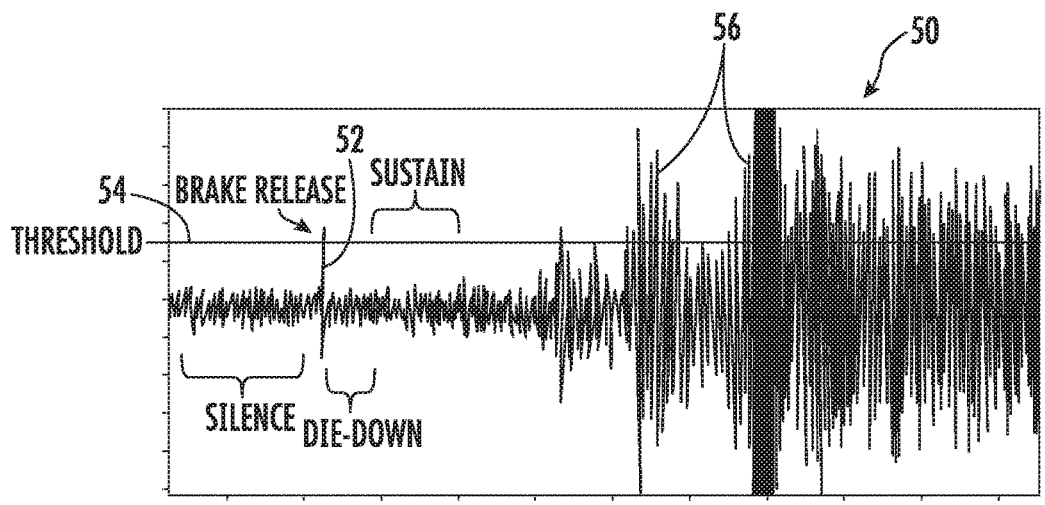
FIG. 3 schematically illustrates an indication of at least one vibration sensor corresponding to an operation of the machine of the elevator system shown in FIG. 1.

For example, FIG. 3 schematically illustrates a vibration sensor output at 50 that indicates when the brake 32 of the elevator machine 22 has dropped or been released at 52. This may occur, for example, at the beginning of a run of the elevator car 24 while providing service to at least one elevator passenger. As can be seen in FIG. 3, the output from at least one of the vibration sensors 38 exceeds the threshold at 54 following a period of relative silence which corresponds to the elevator car being stationary at a landing. The timing of when that threshold 54 is crossed reveals an aspect of the performance or condition of the brake 32. Other aspects of brake operation include brake pick and brake squeal. Also shown at FIG. 3 is a vibration sensor output corresponding to acceleration of the elevator car at 56 as a result of operation of the motor 30 of the elevator machine 22.

Figure 4:
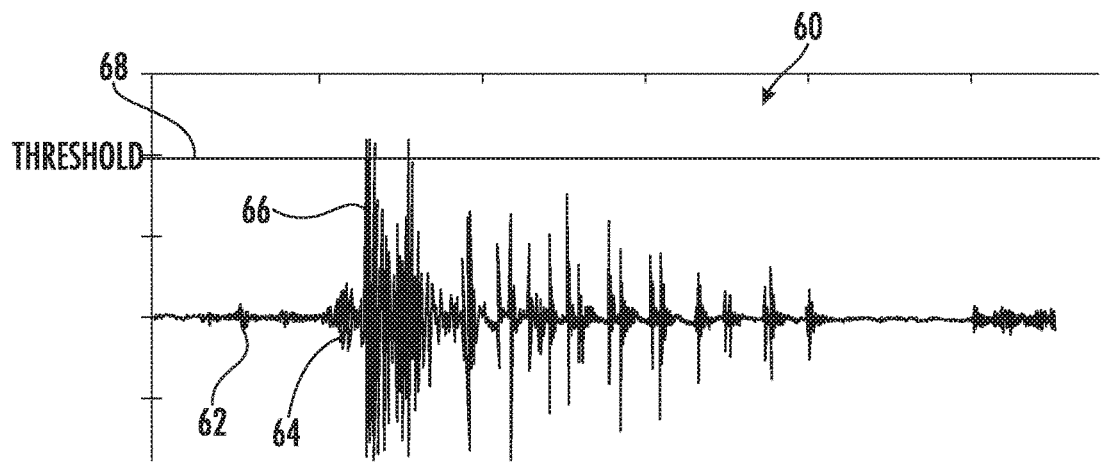
FIG. 4 schematically illustrates an indication of at least one vibration sensor corresponding to another operation of the machine of the elevator system shown in FIG. 1.

FIG. 4 illustrates another example vibration sensor output at 60 including an elevator car moving at a relatively constant speed at 62 followed by an acceleration at 64. In this example, the acceleration represented by the vibration sensor output at 64 triggers an emergency stop of the elevator car which is implemented by applying the brake 32 of the elevator machine 22. The indication from at least one vibration sensor 38 at 66 crosses an emergency stop threshold shown at 68. The processor 44 is configured or programmed to recognize when a vibration sensor output crosses one of the thresholds 54 or 68 to make a determination regarding a condition or operation of the machine 22.

The communication interface 40 provides information regarding the condition or operation detected by at least one vibration sensor 38. The information from the communication interface 40 need not include the raw data schematically shown in FIGS. 3 and 4, for example. Instead, the communication interface 40 in some example embodiments provides information regarding the status or condition of the machine 22. The information communicated by the communication interface 40 in an example embodiment describes the condition as at least one of acceptable, working but maintenance is needed soon and needs immediate repair. Other ways of describing the determined condition are within the scope of embodiments of this invention. Such information allows a remote expert or local mechanic to determine whether a portion of the machine 22 requires immediate attention (e.g., repair or replacement) or should be scheduled for maintenance at some time in the near future.

The information available from the vibration sensors 38 provides the ability to have ongoing, real time monitoring of performance of the elevator system 20. While the indication from the vibration sensors 38 may be available at all times, information communicated by the communication interface 40 may occur on a more limited, selected basis, such as at a prescheduled interval or in response to an inquiry from a mechanic or remote expert using the remote device 42. In some embodiments, when the processor 44 determines that a particular threshold has been crossed that indicates a need for repair of one or more components of the elevator system 20, the communication interface 40 automatically generates a notice or warning regarding the determined condition.

The indications from the vibration sensors 38 provide information regarding the machine operation during each of a plurality of runs of the elevator car 24. The indications can reveal the operation or condition of the motor 30, bearings, or brake 32 as well as machine operation in general. The processor 44 in the illustrated example embodiment provides information regarding trends of the plurality of runs. The stopping and starting movement of the elevator car 24 occurs for each run of the elevator car 24. The vibration sensor indications regarding the machine 22 controlling the stopping and starting of the elevator car allows the processor 44 to determine such information for each run and to determine trends over a plurality of runs.

Situating vibration sensors 38 near an elevator machine 22 and providing an indication of stops and starts of the machine 22 for controlling stopping and starting of movement of the elevator car 24 provides improved elevator monitoring in an efficient manner at a reasonable cost.

The preceding description is illustrative rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. An elevator system, comprising:
   a machine including a motor and a machine brake that applies a brake force to a traction sheave adjacent to the machine brake, the machine being configured to selectively cause movement of an elevator car;
   at least one vibration sensor situated near the machine, the at least one vibration sensor providing an indication of operation of the machine to indicate at least stops and starts of the machine associated with stopping and starting movement of the elevator car, wherein the at least one vibration sensor provides an indication of operation of the machine brake including timing information that corresponds to timing of at least one of a brake release, a brake pick, and a brake squeal of the machine brake; and
   a processor that processes the indication of operation of the machine, determines a condition of at least a portion of the machine based on the indication of operation of the machine, and provides an output corresponding to the determined condition,
   wherein
      a plurality of predetermined vibration thresholds indicate a respective plurality of conditions of the machine,
      the processor determines a relationship between the indication of operation of the machine and at least one of the thresholds, and
      the processor determines the condition of at least the portion of the machine based on the determined relationship.

2. The elevator system of claim 1, comprising a communication interface configured to communicate information corresponding to the indication of operation of the machine to a device remote from the elevator system and
   wherein
   the at least one vibration sensor provides a real time indication of operation of the machine; and
   the communication interface communicates the information in real time.

3. The elevator system of claim 1, wherein the at least one vibration sensor provides an indication of any emergency stops of the elevator car implemented through the machine.

4. The elevator system of claim 1, wherein
   the machine includes a plurality of bearings; and
   the at least one vibration sensor provides an indication of a condition of at least one of the bearings.

5. The elevator system of claim 1, comprising a processor that processes the indication of operation of the machine and
   wherein
   the stopping and starting movement of the elevator car occurs for each of a plurality of runs of the elevator car; and
   the processor provides information regarding trends of the plurality of runs.

6. The elevator system of claim 1, comprising a communication interface configured to communicate information corresponding to the indication of operation of the machine to a device remote from the elevator system and wherein
the information communicated by the communication interface provides an indication of the determined condition of at least the portion of the machine; and
the information communicated by the communication interface describes the condition as at least one of acceptable, working but maintenance is needed soon, and needs immediate repair.

7. The elevator system of claim 1, comprising a machine frame that supports the machine in a stationary selected position and wherein the at least one vibration sensor is supported on at least one of the machine and the machine frame.

8. The elevator system of claim 7, wherein
the machine brake is situated near one end of the machine frame; and
the at least one vibration sensor is supported on the machine frame closer to the one end than an opposite end of the machine frame.

9. The elevator system of claim 1, wherein the at least one vibration sensor comprises a tri-axial microelectromechanical (MEMS) vibration sensor.

10. A method of monitoring an elevator system that includes a machine configured to selectively cause movement of an elevator car, the method comprising:
using at least one vibration sensor situated near the machine to obtain an indication of operation of the machine to indicate at least stops and starts of the machine associated with stopping and starting movement of the elevator car including obtaining an indication of operation of a machine brake that applies a braking force to a traction sheave of the machine, wherein the indication of operation of the machine brake includes timing information corresponding to timing of at least one of a brake release, a brake pick, and a brake squeal of the machine brake;
determining a relationship between the indication of operation of the machine and at least one of a plurality of predetermined vibration thresholds that indicate a respective plurality of conditions of the machine; and
determining a condition of at least a portion of the machine based on the determined relationship, wherein the condition is as at least one of acceptable, working but maintenance is needed soon, and needs immediate repair.

11. The method of claim 10, comprising
obtaining the indication of operation of the machine in real time; and
communicating the indication of operation of the machine in real time to a device remote from the elevator system.

12. The method of claim 10, comprising
using a processor to process the indication of operation of the machine; and
the processor provides information regarding trends of a plurality of runs of the elevator car, wherein the stopping and starting movement of the elevator car occurs for each of the plurality of runs of the elevator car.

13. The method of claim 10, wherein the machine includes a plurality of bearings and the method comprises providing an indication of a condition of at least one of the bearings.

* * * * *